United States Patent [19]

Muraishi

[11] Patent Number: 5,566,276
[45] Date of Patent: Oct. 15, 1996

[54] CHARACTER MODIFYING METHOD

[75] Inventor: Masayuki Muraishi, Nagano-Ken, Japan

[73] Assignee: Nakajima All Precision Co., Ltd., Nagano-Ken, Japan

[21] Appl. No.: 485,991

[22] Filed: Jun. 7, 1995

Related U.S. Application Data

[62] Division of Ser. No. 267,178, Jun. 28, 1994, Pat. No. 5,471,676, which is a continuation of Ser. No. 689,284, filed as PCT/JP90/01337, Oct. 17, 1990, abandoned.

[30] Foreign Application Priority Data

Oct. 17, 1989 [JP] Japan .................................. 1-269322
Nov. 1, 1989 [JP] Japan .................................. 1-285437

[51] Int. Cl.$^6$ .................................................. G06K 15/00
[52] U.S. Cl. .................................... 395/110; 395/115
[58] Field of Search ............................ 395/110, 114, 395/102, 150–151, 115, 164–166; 400/61, 62, 67, 70, 76

[56] References Cited

U.S. PATENT DOCUMENTS 4,516,173  5/1985  Abe et al. ............................. 358/261
4,942,390  7/1990  Do et al. .............................. 400/121
5,117,371  5/1992  Karsten et al. ....................... 395/150
5,119,471  6/1992  Kagaya et al. ....................... 395/110

FOREIGN PATENT DOCUMENTS 031024   7/1981   Japan .
284457  12/1986   Japan .
278052   2/1987   Japan .
027789   5/1987   Japan .
275159   2/1989   Japan .
184154   7/1989   Japan .

*Primary Examiner*—Arthur G. Evans
*Attorney, Agent, or Firm*—Ladas & Parry

[57] ABSTRACT

A character compressing method is disclosed wherein a character is separately grouped at a predetermined pitch in the horizontal direction (row direction) or vertical direction (column direction), and a dot start position and continuous dot length are used as a data for each section having a print dot. In a character modifying method using a character data stored in the manner following the character compressing method, the dot start position data and continuous dot length data are derived as fundamental parameters, the data is subjected to a character modifying operation corresponding to one of various modifying modes, and in accordance with the operation results, the dot start address is changed and print dot information corresponding in amount to the continuous dot length is given.

4 Claims, 5 Drawing Sheets

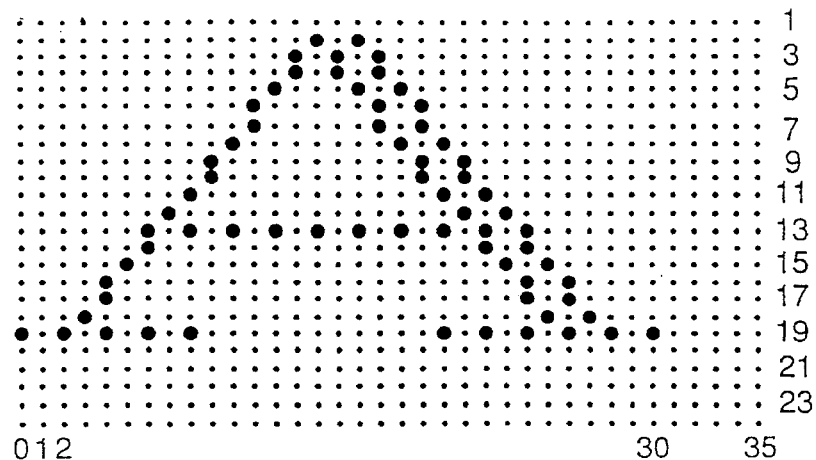
FIG. 1
| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| 00 | 00 | 00 | 00 | 00 | 00 | 00 | 00 | 00 | 00 | 01 | 06 | 08 | 30 | 40 | 30 |
| 00 | 00 | 00 | 00 | 01 | 02 | C0 | 10 | 28 | C0 | 08 | 00 | 08 | 00 | 08 | 00 |
| 20 | 00 | 20 | 40 | A0 | 00 | 20 | 00 | 20 | 00 | 00 | 00 | 00 | 00 | 00 | 00 |
| 16 | 17 | 18 | 19 | 20 | 21 | 22 | 23 | 24 | 25 | 26 | 27 | 28 | 29 | 30 |
|----|----|----|----|----|----|----|----|----|----|----|----|----|----|----|
| 48 | 36 | 09 | 06 | 01 | 00 | 00 | 00 | 06 | 00 | 00 | 00 | 00 | 00 | 00 |
| 08 | 00 | 08 | C0 | 28 | D0 | 2C | 12 | 0D | 02 | 01 | 00 | 00 | 00 | 00 |
| 00 | 00 | 00 | 00 | 20 | 00 | 20 | 00 | A0 | 40 | A0 | 40 | 20 | C0 | 20 |
FIG. 2
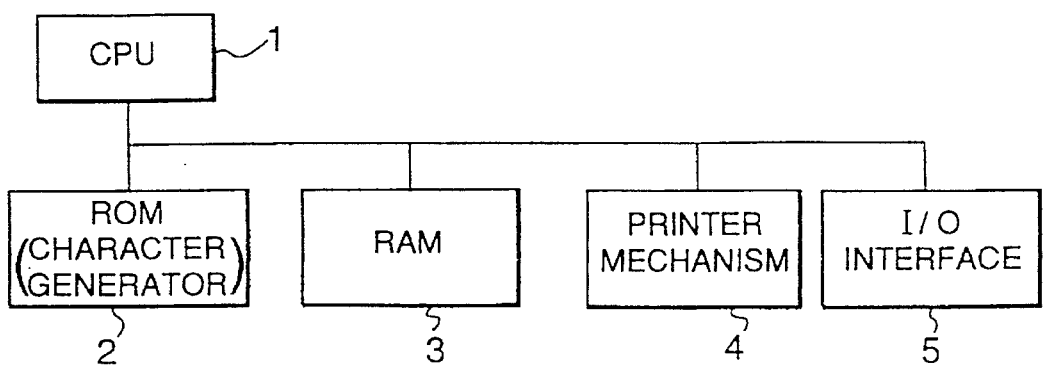
FIG. 4

| SECTION | DATA (BINARY) |
|---|---|
| 2 | 11101110 |
| 3 | 10001101 00000011 |
| 4 | 10001101 00000011 |
| 5 | 01001100,11110000 |
| 6 | 01001011,11110001 |
| 7 | 01001011,11110001 |
| 8 | 01001010,11110010 |
| 9 | 01001001,11110011 |
| 10 | 01001001,11110011 |
| 11 | 01001000,11110100 |
| 12 | 01000111,11110101 |
| 13 | 10000110 00001010 |
| 14 | 01000110,11111000 |
| 15 | 01000101,11111000 |
| 16 | 01000100,11111010 |
| 17 | 01000100,11111011 |
| 18 | 01000011,11111011 |
| 19 | 00000000 00000101,10010100 00000110 |
FIG. 8
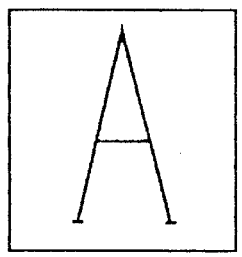
FIG. 3

CHARACTER MODIFYING METHOD

This is a divisional of application Ser. No. 08/267,178 filed on 28 Jun. 1994 now U.S. Pat. No. 5,471,676 which is a continuation of Ser. No. 7/689,284 filed on 17 Jun. 1991, which is international Application JP90/01337 filed on 17 Oct 1990 and which designated the U.S.

TECHNICAL FIELD

The present invention relates to a character data compressing method suitable for use particularly in storing character font data for an electric typewriter, word processor, printer, matrix type display, and the like, in non-volatile memories serving as character generators.

The present invention also relates to a character modifying method suitable for expanding/condensing compressed character font data read from non-volatile memories.

BACKGROUND ART

Conventionally, for a character generator used with a dot matrix printer, a dot matrix liquid crystal display, and the like, dots constituting each character are disposed within a matrix, e.g., having 24 dots per column. Data for each character is produced and stored in a non-volatile memory such as a ROM. The data includes information on whether or not there is a print data for each pin of the dot matrix which is the minimum unit in the horizontal direction, i.e., for each dot position in the vertical direction of the character, information on a character design, information on a data format, information on a character code, and the like. Such a character font is called a bit map font.

FIG. 1 illustrates a dot matrix for a conventional character generator wherein a bit map for a Prestige font "A" is formed. As shown in FIG. 1, dots are disposed in the bit map constructed of 24 rows and 31 columns. The 24 rows in one column are grouped in units of four rows, and the data representative of a presence/absence of dot in each unit of four rows is expressed by a hexadecimal number to provide a character data. In this manner, one column can be expressed by 3 byte data.

The hexadecimal data for the dot map shown in FIG. 1 is given in FIG. 2.

Data stored in a ROM includes 31×3 byte dot data for 31 columns from 0-th to 30-th columns as well as 3 byte data for a front space, character width, and back space shown in FIG. 3. The stored data is therefore 96 byte data in total.

FIG. 4 is a block diagram showing the concept of an apparatus having such a character generator, the apparatus being built in a printer. In this apparatus, a CPU 1 is connected to a ROM 2 serving as a character generator fixedly storing character information, a RAM 3, a printer mechanism 4, and an I/O interface 5. With such an arrangement, CPU 1 controls the printer mechanism 4 to print dot information read from the character generator ROM 2. A similar arrangement is also applicable to a matrix type display or the like.

Such a conventional data structure requires that a bit map should have all dot data of a matrix including a dot data which is not printed. Although each character has many dots which are not actually printed, the data for such dots must be prepared in the bit map, requiring in a large capacity memory.

Furthermore, a character data read from such a character generator is often modified by expansion, condensation, or emphasis. However, the above-described conventional dot storage scheme prepares character data by separately grouping each character in the vertical direction to obtain its character data. As a result, complicated operation is required to modify a character. For example, in the case of expansion, an OR operation is executed by additionally providing null data for one column. In the case of condensation, an OR operation is executed between data for two columns to delete unnecessary dots.

Such operations are carried out in units of bytes (8 bits) or words (16 bits). Therefore, an expansion by $n$ or a condensation by 1/n becomes more complicated than the case of $n=2$, resulting in a lower printing speed.

The present invention has been made to solve the above problems. It is an object of the present invention to provide a method of compressing character data in a character generator, capable of reducing a memory capacity and facilitating character modification operations.

It is another object of the present invention to provide a character modifying method capable of facilitating operation.

DISCLOSURE OF INVENTION

According to the present invention, there is provided a character data compressing method comprising the steps of: cutting out a bit map made of m rows and n columns, at a predetermined pitch in a row or column direction, the bit map being constructed of dots constituting a character; representing a presence/absence of a print dot in each row or column of the first to m-th rows or the first to n-th columns cut out in the row or column direction, by using dot presence data; and supplying information for each row or column having the print dot, the information including the start position of the print dot and the continuity of the print dot.

According to the present invention, there is also provided a modifying method comprising the steps of: reading from a memory a print dot start position data and continuous dot length data for each row or column having a print dot of a character whose dots having been assigned to a bit map made of m rows and n columns; performing an operation corresponding to the contents of character modification, with respect to the print dot start position data and the continuous dot length data; and setting dot print information corresponding to the addresses defined by a continuous dot length obtained by the character modification operation, at new addresses obtained by the character modification operation for the print dot start position data.

A character, particularly an alphanumeric character, has often many line elements in the horizontal or vertical direction. In view of this, according to the present invention, a character is separately grouped at a predetermined pitch in the horizontal direction (row direction) or vertical direction (column direction), and a dot start position and continuous dot length are used as a data for each section having a print dot. Therefore, it is possible to compress a character data considerably and store character fonts in a memory having a small capacity. Furthermore, the expansion/condensation in the horizontal or vertical direction can be carried out readily only by changing the dot start address and continuous dot length, thereby facilitating a character modifying operation.

Furthermore, in a character modifying method using a character data stored in the manner following the character compressing method, the dot start position data and continuous dot length data are derived as fundamental parameters, and the data is subjected to a character modifying operation corresponding to one of various modifying modes. In accordance with the operation results, the dot start address is changed and print dot information corresponding in amount to the continuous dot length is given. Therefore, processes for various types of character modifying modes can be executed easily. Furthermore, a simple operation is available for character modification without adding dots, resulting in high speed operation.

BRIEF DESCRIPTION OF DRAWINGS

FIG. 1 is a diagram illustrating an example of a character font of a bit map style, FIG. 2 is a table showing conventional character data, FIG. 3 is a diagram illustrating spaces before and after each character using conventional character data, FIG. 4 is a block diagram showing an example of the structure of an apparatus having a character generator storing compressed character data, FIG. 8 is a table showing an example of data of a character representing a dot start position and a continuous dot state.

BEST MODE FOR CARRYING OUT THE INVENTION

An embodiment of the present invention will be described with reference to the accompanying drawings.

FIGS. 5 to 8 illustrate how data is compressed according to the present invention.

Figure 5:
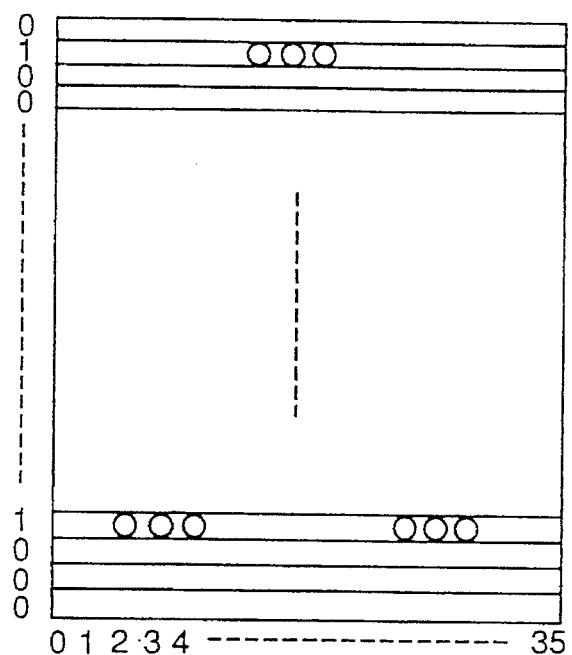
FIG. 5 is a diagram illustrating the fundamental concept of a character data compressing method according to the present invention.
Figure 6:
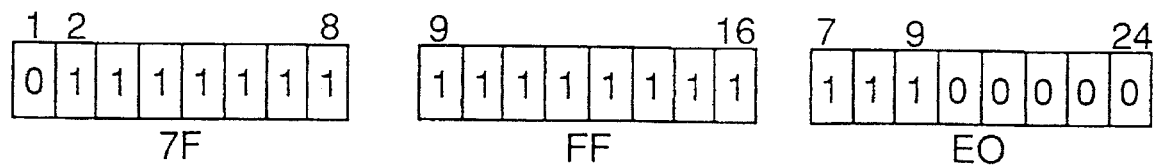
FIG. 6 is a diagram illustrating a presence/absence of a dot in each row obtained by cutting out a character in the horizontal direction.

FIG. 5 is a diagram illustrating character data cut out in the horizontal direction (row direction) in accordance with the present invention.

A Prestige font "A" is used by way of example similarly to the description of the prior art. This character is developed in a 24×31 dot matrix map. In addition to the 31 bits, 4 bits from 32-th to 35-th bits are provided for a script font and proportional printing which requires a wider space than 31 bit width. This map is grouped into 1st to 24-th sections for each column. The character data is given in the following manner.

(A) Section Information

Section information is a data representative of the presence/absence of a dot data in each of 24 sections. For example, this information is a one bit data which takes "1" when a data is present in the corresponding section, and "0" when not present. Therefore, one row can be represented by 24 bits/8=3 bytes, for example, by three groups of hexadecimal numbers 7F, FF, and E0 as shown in FIG. 2.

(B) Option Information

Option information is another data necessary for printing, and has one byte reserved. For example, this information designates the center position of a character design, the type of data format, or the like.

(C) Character Data

The character data represents the positions of dots constituting a character and the continuous dot length.

Figure 7A:
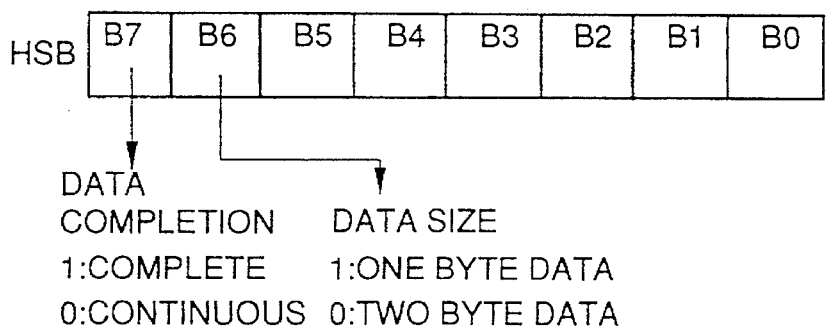
FIGS. 7a, 7b, 7c & 7d show examples of construction of character data.

The character data will be described taking the dot matrix shown in FIG. 1 as an example. The character data is constructed of an 8 bit data as shown in FIG. 7A. B7 of MSB indicates the state of dots. Namely, "1" represents a complete state of dots, and "0" represents a continuous state of dots. The "complete state" means that a set of dots is present at only one area. The "continue state" means that another set of dots is present at another area. From the viewpoint of printing requisites, a set of dots means dots consecutively disposed every other one position. In the example shown in FIG. 1, sections 2, 3, 4, and 13 have one set of dots, and B7 of these sections takes "1" as shown in FIG. 8.

B6 represents a data size. "1" represents one byte data for the case where the number of dots is two or smaller. "0" represents a two byte data for the case where the number of dots is three or larger.

Figure 7B:
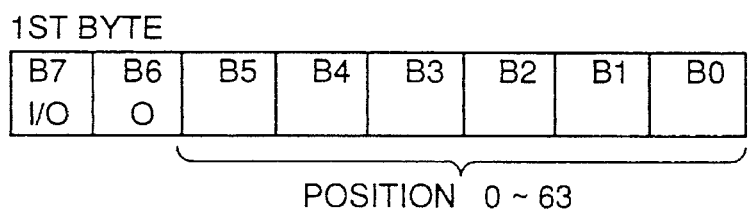
Figure 7C:
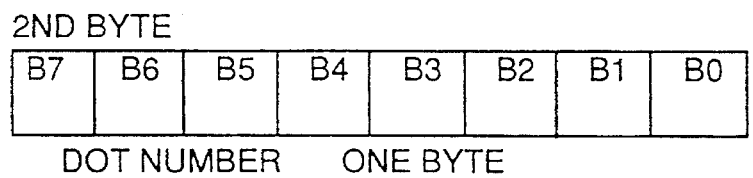
Figure 7D:
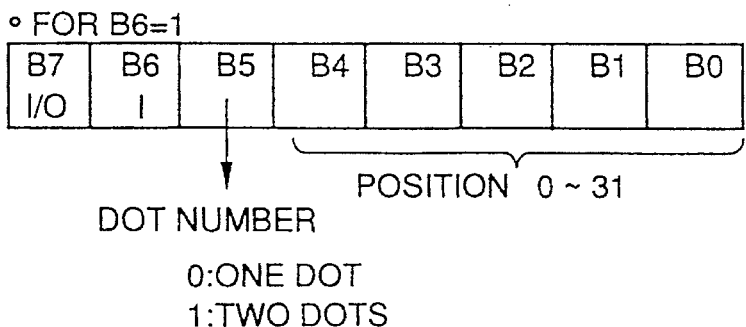

An example of B6=1 is shown in FIG. 7D. In this case, the number of dots can be expressed by one bit of B5, and the position from 0-th column to 31-th column is expressed by bits B4 to B0. Therefore, both the number of dots and the position of a start dot can be expressed by one byte.

In contrast, in the case of B6=0, the position is expressed by bits B5 to B0 in the first byte as shown in FIG. 7B, and the number of dots is expressed by one byte bits B7 to B0 of the second byte as shown in FIG. 7C.

The particular example shown in the dot matrix of FIG. 1 will be described in more detail with respect to the method of obtaining a bit map of a character in the above-described manner.

Section 2: Two dots are disposed starting from the 14-th column. Therefore, B7=1, B6=1, B5=1, and the position 14 is represented by 01110 (binary notation), providing the character data of 11101110.

Section 3: Three dots are disposed starting from the 13-th column. Therefore, B7=1, and B6=0 indicating that the data size is two bytes. In the first byte, only the position 13=01101 (binary notation) is given, and in the second byte, only the number of bits, 3, is given. The results are the first byte 10001101 and second byte 00000011.

Section 5: One dot is disposed on the 12-th column and two dots are disposed starting from the 16-th column. Therefore, the two byte data is obtained as 01001100 and 11110000.

Section 13: Ten dots are disposed starting from the 6-th column, indicating the two byte data size. Therefore, B7=1 and B6=0, resulting in the first byte 10000110 and second byte 00001010.

Section 19: Five dots area disposed starting from the 0-th column, and six dots are disposed starting from the 20-th column, resulting in two sets of two byte data.

The resultant data is shown in FIG. 8.

As seen from FIG. 8, the character data of this example requires 37 bytes.

As a result, the character "A" shown in FIG. 1 can be represented only by a maximum of 41 bytes including the section information (A), option information (B), and character data (C). Fifty five bytes are deleted as compared with the conventionally required number of bytes, reducing to less than a half of the conventional byte number.

In the above embodiment, a bit map is cut out in the horizontal direction. It is also possible to cut out and develop a bit map in the vertical direction, allowing the same data compression.

Furthermore, in the above embodiment, the bit start position is indicated by a positive number. The bit start position may be indicated by a positive or negative number relative to the character center position 0.

The character modifying process for a character data stored by using the above method can be simplified.

Figure 9:
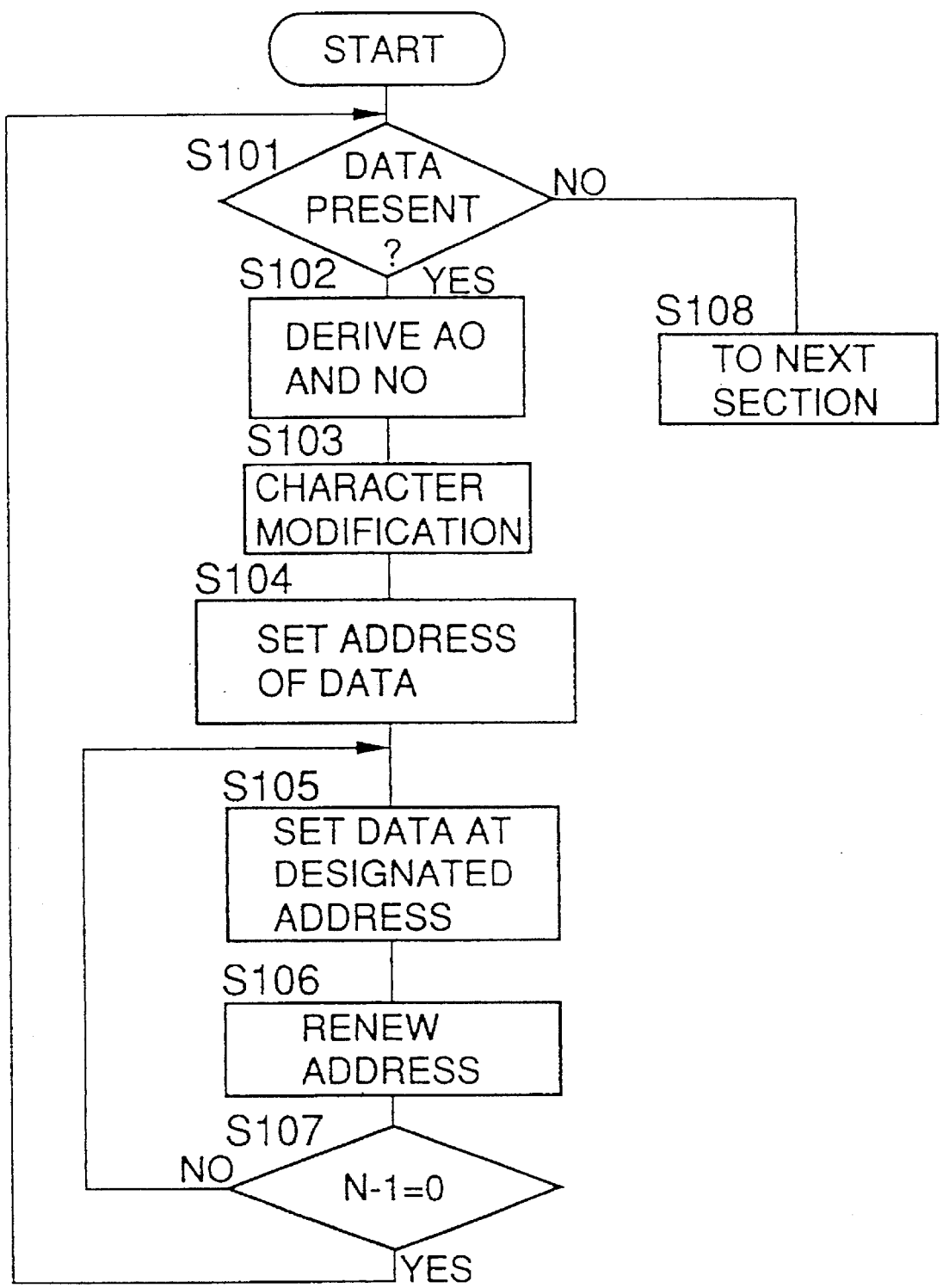
FIG. 9 is a flow chart illustrating the contents of the character modifying method according to the present invention.

FIG. 9 is a flow chart showing the details of the character modifying method according to the present invention.

It is assumed, for example, that the character generator stores therein the dot presence information (FIG. 6) at each section of the character "A" of FIG. 1 separately grouped in the horizontal direction, and the dot start position data and continuous dot length data (FIG. 8).

First, it is checked for a certain character if there is any dot data in the first section (first row) (step S101).

If there is a dot data, a dot start position data A0 and dot continuous length data N0 are read from the character generator (step S102).

In accordance with the read-out data, an operation for character modification is executed (step S103). Such an operation includes the following ones.

(1) Expansion by $n$
AnEX=nA0
NnEX=nN0
(2) Condensation by 1/n
AnCON=INT(A0/n)
NnCON=INT(N0/n+1)
where INT corresponds to an integral part.
(3) Emphasis (emphasis factor m)
AEm=a0
NEM=N0+ m
where m is equal to or larger than 1.
(4) Expansion by n and Emphasis (emphasis factor m)
AnEXEM=nA0
NnEXEM=nN0+ m
where m is equal to or larger than 1.
(5) Condensation by 1/n and Emphasis (emphasis factor m)
AnCONEM= INT(A0/n)
NnCONEM= INT(N0/n+1+m)
(6) Expansion by x and Condensation by 1/y $$Ax/y = xA0/y$$

$$Nx/y = \begin{cases} N0 \text{ for } x/y = 1 \\ INT(xN0/y + 1) \text{ for } x/y < 1 \\ INT(xN0/y) \text{ for } x/y > 1 \end{cases}$$

(7) Expansion by x, Condensation by 1/y, and Emphasis (emphasis factor m)

$$Ax/y = xA0/y$$

$$Nx/y = \begin{cases} N0 \text{ for } x/y = 1 \\ INT(xN0/y + 1 + m) \text{ for } x/y < 1 \\ INT(xN0/y + m) \text{ for } x/y > 1 \end{cases}$$

Next, the address at which the obtained data is stored is set (step S104). Specifically, a reference address for a character is added to the value A obtained through the character modifying operation, and the added result is used as the new address at the time of character modifying. If a slanted character is intended, the displacement degree of the address for each row is changed with the slant degree.

The dot print data is set at the address obtained in the above manner (step S105).

The address is renewed to the address for the next dot (step S106). It is checked if the number of dots subjected to the calculation of step S103 is 0 or not, i.e., if the operation for the last dot has been completed or not (step S107). If not, the control returns to step S105 to repeat the above steps until the number of dots subjected to the calculation becomes 0.

After the operation for the last dot among a set of dots has been completed, the control returns to step S101 to check if there is any dot in the row or in another column. The steps S101 to S107 are repeated until the dot data becomes not present.

If at step S101 there is no dot data to be processed, the control advances to the next section (step S108). Similar operations are executed for the next section to complete the modifying operation of the entire character.

In the apparatus shown in FIG. 4, the dot start position data A0 and continuous dot length data N0 are read from ROM 2, and the character modifying procedure is performed by CPU 1 in accordance with the flow chart shown in FIG. 9. In accordance with the obtained dot information, the printer mechanism 4 is controlled to print out the information.

As described above, according to the character modifying method of the present invention, various modifying processes are executed using the common parameters A and N in place of the conventional operation which has been executed in units of byte. In addition, an address without dot data is not searched. Accordingly, the processes can be speeded up. Furthermore, various processing are possible only by changing the contents of operations for the common parameters, and it is possible to readily and freely change the magnification factor, reduction factor, emphasis factor, and slant degree.

In the above embodiment, the character modifying procedure is performed for sections in the row direction. The procedure for sections in the column direction with a character generator storing character fonts can be executed quite the same manner.

A known smoothing (kerning) process may be carried out to smoothen the contour of a character after the character modifying process.

I claim:

1. A character modifying method comprising the steps of:

reading from a memory a print dot start position data and continuous dot length data for each row or column having a print dot of a character whose dots have been assigned to a bit map made of m rows and n columns;

performing a character modification operation corresponding to the contents of a character modification, with respect to said print dot start position data and said continuous dot length data to obtain modified dot print information; and setting obtained modified dot print information as to the addresses defined by a continuous dot length obtained by said character modification operation, at new addresses obtained by said character modification operation for said print dot start position data.

2. The character modifying method according to claim 1, wherein said character modification is at least one selected from the group consisting of expansion, condensation and emphasis.

3. The character modifying method according to claim 1, wherein said character modification operation is carried out in the row direction of the print dots.

4. The character modifying method according to claim 1, comprising providing, in said memory, print information related to said dots in said print map, wherein said print information comprises:

a most significant bit indicating that a set of continuous print dots is in the last one in the row or column or that another set of continuous dots exist in the row or column;

a bit next to the most significant bit indicating that the data size is one byte or two bytes; and if said data size is one byte, the third and following bits representing number of dots and dot position, or if said data size is two bytes, a third and following bits of a first byte representing dot position and the second byte data representing number of dots.

\* \* \* \* \*